United States Patent
Meaney, Jr.

(10) Patent No.: US 6,536,547 B1
(45) Date of Patent: Mar. 25, 2003

(54) HYBRID ELECTRIC VEHICLE HAVING ALTERNATE POWER SOURCES

(76) Inventor: Daniel J. Meaney, Jr., P.O. Box 22307, Santa Barbara, CA (US) 93121

( * ) Notice: Subject to any disclaimer, the term of this patent is extended or adjusted under 35 U.S.C. 154(b) by 0 days.

(21) Appl. No.: 09/305,912

(22) Filed: May 5, 1999

(51) Int. Cl.[7] ............................................... B60K 6/00
(52) U.S. Cl. .................................................. 180/65.2
(58) Field of Search ........................... 180/65.1, 65.2, 180/65.3, 65.4, 65.6; 123/3, DIG. 12

(56) References Cited

U.S. PATENT DOCUMENTS

| | | | |
|---|---|---|---|
| 4,099,589 A | | 7/1978 | Williams ................... 180/65 A |
| 4,112,875 A | * | 9/1978 | Laumann et al. ............... 123/1 |
| 4,182,960 A | * | 1/1980 | Reuyl ......................... 290/1 R |
| 5,343,970 A | | 9/1994 | Severinsky ................. 180/65.2 |
| 5,399,251 A | | 3/1995 | Nakamats ................... 204/262 |
| 5,401,589 A | | 3/1995 | Palmer et al. .................. 429/13 |
| 5,656,916 A | * | 8/1997 | Hotta ............................ 320/22 |
| 5,670,830 A | * | 9/1997 | Koga et al. ................. 307/10.1 |
| 5,695,893 A | | 12/1997 | Arai et al. ................... 429/221 |
| 5,780,980 A | | 7/1998 | Naito .......................... 318/139 |
| 5,785,136 A | * | 7/1998 | Falkenmayer et al. ..... 180/65.2 |
| 5,820,172 A | | 10/1998 | Brigham et al. .......... 290/40 C |
| 5,842,534 A | | 12/1998 | Frank ......................... 180/65.2 |
| 5,875,691 A | | 3/1999 | Hata et al. .................... 74/661 |
| 6,044,922 A | * | 4/2000 | Field ......................... 180/65.2 |
| 6,054,838 A | * | 4/2000 | Tsatsis ........................ 320/101 |
| 6,081,042 A | * | 6/2000 | Tabata et al. ................. 290/45 |

FOREIGN PATENT DOCUMENTS

| | | | | |
|---|---|---|---|---|
| CH | 688202 A5 | * | 6/1997 | ................ 180/65.2 |
| DE | WO91/08122 | * | 6/1991 | ................ 180/65.2 |
| GB | 2345729 A | * | 7/2000 | ................ 180/65.2 |

\* cited by examiner

*Primary Examiner*—Brian L. Johnson
*Assistant Examiner*—G B Klebe
(74) *Attorney, Agent, or Firm*—Daniel J. Meaney, Jr.

(57) ABSTRACT

A hybrid electric vehicle having alternate fuel sources is shown. The hybrid electric vehicle includes an alternating current to direct current converter for producing and storing a direct current voltage in a direct current voltage storage device. A fuel converter receives fuel in a first state and converts the fuel into a combustible material or a combustible fuel in a second state which is stored in a combustible material storage device. A driving system for transporting the hybrid electric vehicle includes a direct current motor operatively connected to the direct current voltage storage device. The direct current motor is responsive to a stored direct current voltage for driving the driving system in response to a first control signal. A combustible material engine is operatively coupled to the driving system and drives the driving system in response to a second control signal. A control device is operatively connected to the direct current motor and to the combustible material engine to selectively apply at least one of the first control signal to the direct current motor and the second control signal to the combustible material engine to enable the driving system to be powered or driven by at least one of the direct current voltage and the combustible material.

33 Claims, 3 Drawing Sheets

HYBRID ELECTRIC VEHICLE HAVING ALTERNATE POWER SOURCES

BACKGROUND OF THE INVENTION

1. Field of the Invention

This invention relates to a motor vehicle having alternate power sources including a direct current voltage storage device and a combustible fuel storage device and more particularly relates to a hybrid electric vehicle having separate storage devices for a combustible fuel produced by a fuel converter from a composition combustible fuel and for direct current voltage and wherein a control device that is operatively connected to a direct current motor and to a combustible material or combustible fuel engine, selectively applies at least one of a first control signal to the direct current motor and a second control signal to a combustible material motor or combustible fuel engine to enable a driving system driving the hybrid electric vehicle to be powered or driven by at least one of the direct current voltage and the combustible material or combustible fuel generated from a composition combustible fuel.

2. Description of the Prior Art

Hybrid electric vehicles powered by direct current motors using batteries as energy devices and internal combustion engines powered by gasoline are well known in the prior art. Examples of electric vehicles are disclosed in U.S. Pat. Nos. 5,343,970 and 4,099,589. U.S. Pat. No. 5,343,970 discloses a hybrid electric vehicle and U.S. Pat. No. 4,099,589 discloses an electric car, each of which have a gasoline powered internal combustion gasoline engine and an electric motor which is powered by direct current stored in batteries.

U.S. Pat. No. 5,875,691 discloses a hybrid drive system for outputting the power of an internal combustion engine and the power of a motor generator through a transmission to drive the vehicle.

Numerous methods have been proposed to manage the stored electrical power in hybrid vehicle to improve both operating performance and driving range. For example, U.S. Pat. No. 5,820,172 discloses an operating strategy for a hybrid electric vehicle that manages the flow of energy to both supply the motive demand power of the hybrid electric vehicle and to maintain the charge of the energy storage system.

U.S. Pat. No. 5,780,980 discloses an electric car drive system having a car drive motor powered by a mounted direct current power supply and a control system including a signal generating means to generate signals which control motor speed. The direct current power supply is composed of a power battery having secondary cells connected to the motor and an energy battery formed by fuel cells connected in parallel to the power battery via an energy battery control switch. The electric vehicle includes a charge control means to keep the charge on the power battery using the energy batteries if the charge of the power battery is below a specified value.

Motor vehicles having alternate source of power other than batteries for powering a motor vehicle are known in the art. For example, U.S. Pat. No. 5,399,251 discloses a system for generating hydrogen and oxygen using water in a tank having a solid polyelectric film which separates the tank into operating sections and uses electrodes for generating hydrogen. The power generating system is a separate power source and generates a second combustible fuel which is mixed together, with gasoline as a first composition combustible fuel to power a motor vehicle using an internal combustion engine.

Motor vehicles have also used propane gas stored in a pressurized tank and as an alternative to gasoline as alternate sources of fuel to power an internal combustion engine for driving the vehicle.

In hybrid electric vehicles and in electric cars, the batteries function as a direct current voltage storage device. The batteries are typically charged prior to use using an alternating current and known battery charging systems using alternating current-to-direct current converters. Internal combustion engines may be used to drive battery-charging circuits and/or direct current voltage generators as means for maintaining a charge on the batteries during operation of the vehicle. Fuel cells, forming part of an energy battery, are connected in parallel to the power battery via an energy battery control switch. Fuel cells have been used for maintaining a charge on the power battery.

Due to the absence of standard methods and apparatus for charging batteries in hybrid electric vehicles and electric cars, different manufacturers of electric vehicles use different charging circuits thereby requiring the user to locate and use a charging system designed for the vehicle. This results in an inconvenience to the user, one of many objections and reasons inhibiting use of electric vehicles.

Another problem associated with prior art electric vehicles is the inefficient use of fuel cells that convert hydrogen into electricity for charging the batteries.

Further, there is not a standard method, apparatus or system available for offering alternative standardized electrical energies or combustible fuels for charging or servicing a hybrid electric vehicle or electric car which are equivalent to services offered in service stations for standard gas or diesel powered motor cars using internal combustion engines.

SUMMARY OF THE PRESENT INVENTION

The present invention discloses and teaches a new, novel and unique hybrid electric vehicle having alternate power sources for powering or driving a hybrid electric vehicle. This invention enables the hybrid electric vehicle to be serviced using a standard alternating current source, a standard direct current source and/or a standard combustible fuel source.

The hybrid electric vehicle of the present invention includes an alternating current to direct current converter for producing and storing a direct current voltage in a direct current voltage storage device. A fuel converter that receives a composition fuel in a first state converts the fuel into a combustible material or combustible fuel in a second state and the combustible material or combustible fuel in said second state is stored in a combustible material or combustible fuel storage device. A driving system that transports the hybrid electric vehicle includes a direct current motor, which is operatively coupled to the driving system and to the direct current voltage storage device. The direct current motor is responsive to the stored direct current voltage for driving the driving system in response to a first control signal. A combustible material motor or combustible fuel engine is operatively coupled to the driving system and is responsive to the stored combustible material or combustible fuel in the second state for driving the driving system in response to a second control signal. A control device is operatively connected to the direct current motor and to the combustible material or combustible fuel engine.to selectively apply at least one of the first control signal to the direct current motor and the second control signal to the combustible material or combustible fuel engine to enable the driving system to be driven by at least one of the direct current voltage and the combustible material or combustible fuel.

In addition, a new and novel method of driving or powering a motor vehicle with alternate fuel sources is disclosed and taught by the present invention. The method comprises the steps of producing with an alternating current to direct current converter a direct current voltage; storing the direct current voltage in a direct current voltage storage device; receiving with a fuel converter a fuel in a first state and converting the fuel into a combustible material in a second state; storing the combustible material in the second state in a combustible material storage device; transporting with a driving system the motor vehicle wherein the driving system includes a direct current motor operatively coupled to the direct current voltage storage device and the direct current motor is responsive to stored direct current voltage for driving the driving system in response to a first control signal and a combustible material motor operatively coupled to the driving system is responsive to stored combustible material in the second state for driving the driving system in response to a second control signal; and selectively applying with a control device operatively connected to the direct current motor and to the combustible material motor at least one of the first control signal to the direct current motor and the second control signal to the combustible material motor to enable the driving system to be driven by at least one of the direct current voltage and the combustible material.

In the method, the step of selectively applying may include the control device selectively applying both the first control signal to the direct current motor and the second control signal to the combustible material engine to enable the driving system to be concurrently driven by the direct current voltage and the combustible material.

The problem associated with the absence of standard methods for charging batteries in a hybrid electric vehicle is overcome by use of a direct current voltage storage device and a combustible fuel storage device wherein the alternative energy sources are prestored and available in the hybrid electric vehicle prior to use.

A service facility for a hybrid electric vehicle utilizing the teachings of the present invention may offer any one of or all of the following energies: (i) an alternating current, such as for example a 120/240 volt, 60 hertz, single phase, alternating current or a 120/240 volt, 60 hertz, three phase alternating current or a 120/208 volt, 60 hertz three phase alternating current, which can be plugged into the hybrid electric vehicle or electric car to charge the direct current voltage storage device such as for example, a battery, and/or power a fuel converter to produce and store a combustible fuel in a combustible fuel storage device; (ii) a direct current voltage having a standard electrical characteristic, say for example, 12 volts DC, for directly charging a power battery thereby eliminating or bypassing the need for an AC/DC converter, the specifications of which may vary by manufacturer; (iii) filling or charging a combustible fuel storage device directly with a combustible fuel which would otherwise be produced by a composition combustible fuel converter from a composition combustible fuel; or (iv) a composition combustible fuel, such as gasoline or other similar composition combustible fuel.

Thus, different charging circuits from different manufacturers will no longer pose a problem because a standard 120/240 volts, 60 Hertz alternating current source may be used to charge the direct current voltage storage device, e.g. battery and the combustible material storage device can be charged with a combustible fuel, e.g. hydrogen in a pressurized tank.

The prior art problems of the battery being discharged during use or operation is overcome by use a combustible fuel storage device that can be replenished during use by a fuel cell or fuel converter using an organic fuel, such as for example methanol, and the converter converts the same to a combustible fuel, such as for example hydrogen, which is stored, used to recharge a battery or drive the combustible engine depending on the power needs.

As improved fuel cells are developed, the types of fuel that can be used to generate the hydrogen or other combustible fuel will become more extensive. Such known fuels include gasoline, hydrolysis of water, pure hydrogen and methanol or other composition combustible fuels that can be converted into a combustible fuel to power recharging of a battery or as fuel for a combustible fuel engine.

As economical and safe minirefineries are developed that can be installed into hybrid electric vehicles for use in converting fuels into hydrogen or other combustible fuels, such as for example to convert methanol into hydrogen to feed a fuel cell or for use as a combustible fuel to power a vehicle, the use of a separate fuel converter and combustible fuel storage device, as disclosed and taught herein, results in an effective system for powering a hybrid electric vehicle for alternative fuel sources. Such hybrid electric vehicles can be serviced by a service facility offering the alternative fuels in the same manner as gasoline service stations offer multi-grade unleaded fuels for gasoline motor vehicles and diesel fuel for motor vehicles.

None of the known prior art anticipate, disclose, teach or suggest a hybrid electric vehicle having a driving system driven by a direct current motor powered by a battery and a internal combustion engine powered by a combustible fuel and a battery charging device adapted to be connected to a source of alternating current for charging the battery and wherein the hybrid electric vehicle comprises a fuel converter for receiving a composition combustible fuel in a first state and converting the composition combustible fuel into a combustible material in a second state and for storing the combustible material in the second state in a combustible material storage device. Further, the prior art does not disclose, teach or suggest a control device that is operatively connected to and controls the direct current motor for driving the driving system in response to a first control signal and the combustible material engine powered from a separate combustible material storage device for driving the driving system in response to a second control signal. The control device is adapted to selectively applying at least one of the first control signal to the direct current motor and the second control signal to the combustible material engine to enable the driving system to be driven by at least one of the direct current voltage and the combustible material.

Therefore, one advantage of hybrid electric vehicle of the present invention is that fuel converter is adapted to receive a composition combustible fuel stored in the vehicle in a first state and to convert the composition combustible fuel into a combustible material in a second state and for storing the combustible material in the second state in a combustible material storage device. The vehicle can use either or both power sources for driving or powering the vehicle.

Another advantage of the present invention is that the combustible fuel converter is responsive to a source of alternating current for converting the composition combustible fuel into a combustible material in a second state and for storing the combustible material in the second state in a combustible material storage device.

Another advantage of the present invention is that a service facility can offer an alternating current voltage, a direct current voltage and a combustible fuel to charge or fill each of the separate storage devices which are separate from a standard composition combustible fuel storage tank which stores a standard composition combustible fuel such as gasoline, methanol or the like.

A still another advantage of the present invention is that the hybrid electric vehicle control device controls the alternating current source to enable the battery charger to charge the battery to a desired charging level and the fuel converter to fill the combustible fuel storage device to a desired volume level.

A still another advantage of the present invention is that the control device in the hybrid electric vehicle can concurrently apply the first control signal to the direct current motor and the second control signal to the combustible material engine to enable the driving system to be driven by both said direct current voltage and said combustible material.

A still yet another advantage of the present invention is that a novel method of driving a motor vehicle with alternate fuel sources is disclosed and taught by the present invention.

BRIEF DESCRIPTION OF THE DRAWINGS

The foregoing and other advantages of this invention will be apparent from the following description of the preferred embodiment of the invention when considered with the illustrations and accompanying drawings, which include the following Figures.

DESCRIPTION OF THE PREFERRED EMBODIMENT

Typically, a hybrid electric vehicle includes a driving system that is driven by either or both a direct current motor powered by a battery and an internal combustion engine powered by a composition combustible fuel such as gasoline. A battery-charging device is adapted to be connected to a source of alternating current for charging the battery. The battery is charged to a desired charging level prior to use. The hybrid electric vehicle may be driven by a separate internal combustion engine powered by a composition combustible fuel such as gasoline. During operation, the hybrid electric vehicle may include various means for keeping the battery charged such as regenerative braking systems, flywheel charging systems or by use of direct current generators driven by the internal combustion motor. The present invention as disclosed and described herein is adapted to be used with such hybrid electric vehicles.

Figure 1:
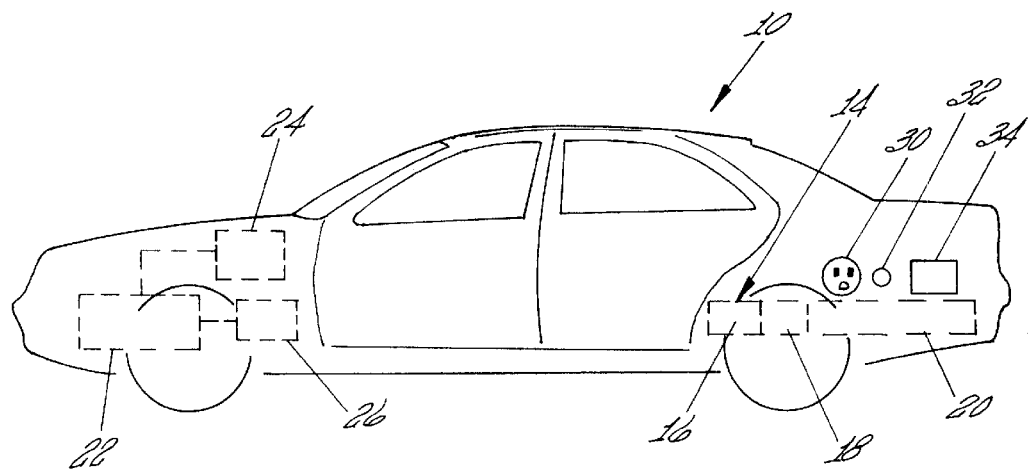
FIG. 1 is a pictorial representation of a hybrid electric vehicle having a direct current voltage storage device, a fuel converter and a driving system having a direct current motor and a combustible material or combustible fuel engine for transporting a hybrid electric vehicle.

In the pictorial representation of FIG. 1, a motor vehicle, which is in the preferred the hybrid electric vehicle, is shown generally as 10 and includes at the rear thereof a combustible fuel storage area 14 having a fuel converter 16 and a combustible fuel storage device 18. Also located in the rear of the vehicle 10 is a direct current voltage storage device 20.

The vehicle 10 includes a composition combustible fuel filling and storage system that is depicted by inlet 34 to receive and store a composition combustible fuel in a tank, such as for example, gasoline.

The hybrid electric vehicle includes an alternating current to direct current converter for producing and storing a direct current voltage in the direct current voltage storage device 20. Such a converter is generally known as a battery charger that is adapted to be operatively connected to an alternating current source. In addition, a direct current voltage source can be connected to the vehicle to directly charge the battery with a direct current. The input plug adapted to be connected to either an alternating current source or direct current voltage source is shown as 30. The orifice for enabling the charging or filling of a combustible fuel storage device with a combustible fuel, such as hydrogen, is generally shown as inlet 32. The front of the vehicle 10 includes a driving system 22 for transporting a hybrid electric vehicle that is driven by a direct current motor 24 and a combustible material or combustible fuel engine 26.

The direct current voltage storage device 20 are main power batteries, such as for example lead-acid batteries, lithium batteries or other rechargeable batteries adapted for use in hybrid electric vehicle.

Figure 2:
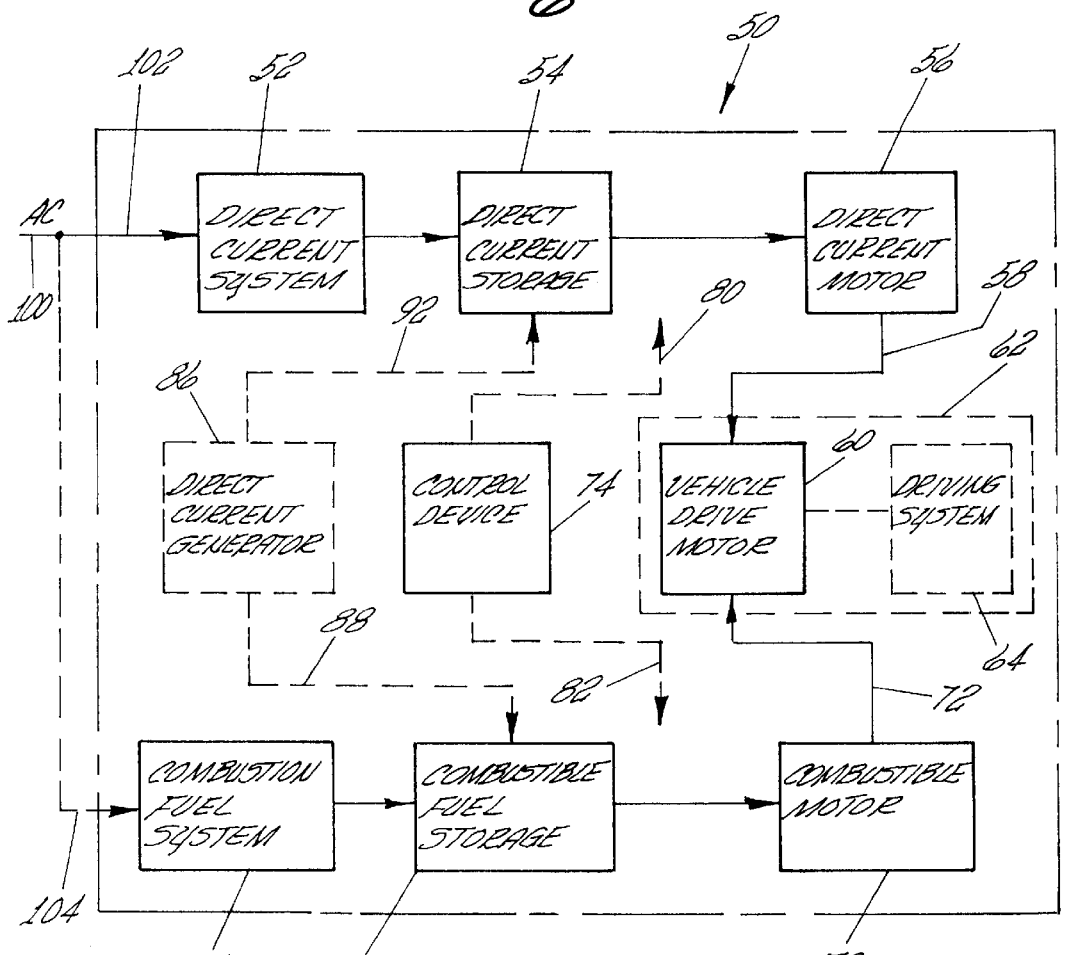
FIG. 2 is a block diagram of a hybrid electric vehicle wherein a control device controls an alternating current source to enable the battery charger to charge the battery to a desired charging level and a fuel converter produces a combustible fuel for filling the combustible fuel storage device to a desired volume level or weight.

The block diagram of FIG. 2 illustrates a vehicle control system shown generally as 50 for a hybrid electric vehicle. The vehicle control system 50 includes a direct current charging system 52 which converts an alternating current voltage 100 applied thereto by input 102 to produce a direct current voltage for storage in a direct current voltage storage device 54.

The control system 50 includes a driving system 62 for transporting a hybrid electric vehicle. The driving system 62 includes a vehicle drive motor 60 and drive train 64 which drives or transport the vehicle. A direct current motor 56 is operatively coupled to the vehicle drive motor 60 of the driving system 62 and to the direct current voltage storage device 54. The direct current motor 56 is responsive to a stored direct current voltage for driving the vehicle drive motor in response to a first control signal from a control device 74. The control device 74 is operatively coupled to, monitors, senses and/or controls each of the various components via conductors 80 and 82.

Figure 3:
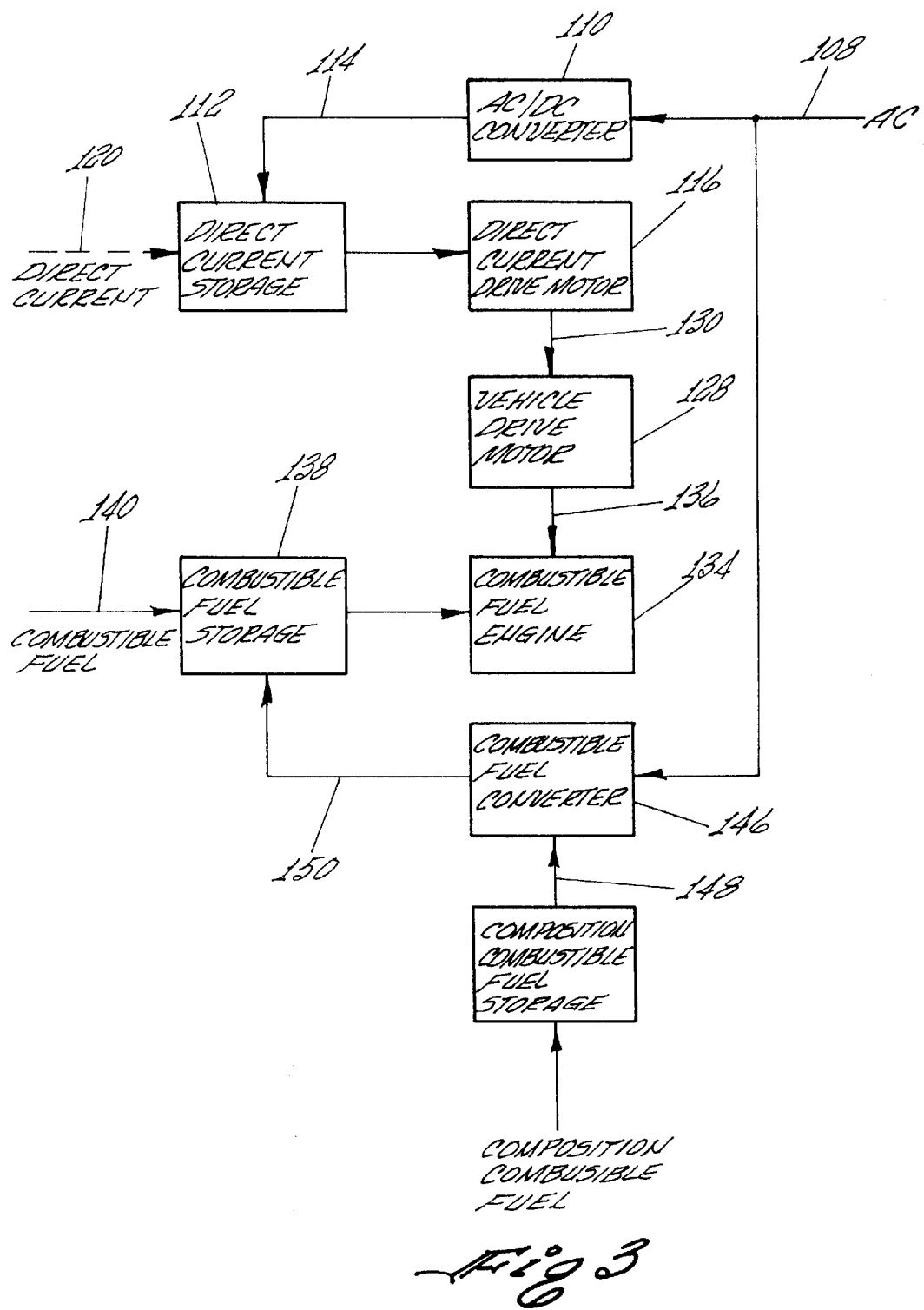
FIG. 3, is a block diagram of a hybrid electric vehicle using the teachings of the present invention which is capable of charging a direct current voltage storage device either directly from a direct current source or from an alternating current source and an AC/DC converter.

A composition fuel system, shown generally as 66, includes a fuel converter, such as for example a fuel converter shown as 146 in FIG. 3, for receiving a fuel or a composition combustible fuel in a first state and converting the fuel into a combustible material or combustible fuel in a second state. For example, the composition combustible fuel may be an organic fuel such as methanol, which is in liquid form as a first state. The fuel converter may produce hydrogen from methanol, a combustible fuel in the form of a gas which is a combustible fuel in a second state. The combustible material or combustible fuel in the second state is a gas is stored in the combustible fuel storage 68. It is envisioned that the gas could be stored under a pressure which causes the gas to become liquefied. The second state of the combustible fuel as used herein would include the first state and second state being the same e.g., both liquids.

In FIG. 2, the combustible material may be a combustible fuel such as hydrogen. The combustible material or combustible fuel is stored in a separate combustible fuel storage 68 which can be filled to a desired volume or weight. The fuel converter 146 can be used to maintain or replenish the volume or weight of combustible fuel in the combustible fuel storage device 66 during operation of the hybrid electric vehicle.

In FIG. 2, the composition fuel system 66 is adapted to receive an alternating current and to be responsive thereto to cause the fuel converter, or similar device such as for example a fuel cell, to produce the combustible fuel which is stored in the combustible fuel storage 68.

A combustible fuel engine 70 is operatively coupled via a coupling member or drive member 72 to the vehicle drive motor 60 of the driving system 62. The combustible fuel motor 70 is responsive to the stored combustible material or combustible fuel in the second state for driving the driving system 62 in response to a second control signal from the control device 60.

The control device 74 is operatively connected to the direct current motor 56 and to the combustible fuel engine 70 via conductors 80 and 82 to selectively apply at least one of the first control signal to the direct current motor 56 and the second control signal to the combustible fuel engine 70 to enable the driving system 62 to be driven by at least one of the direct current voltage and the combustible material.

In a typical hybrid electric vehicle, the control device 74 via conductors 80 and 82 controls the alternating current sources 100 and 104 to enable a battery charger to charge a battery to a desired charging level and the fuel converter to fill the combustible material fuel storage device to a desired volume or weight level.

The control device 74 may selectively apply both the first control signal to the direct current motor 56 and the second control signal to the combustible fuel engine 70 to enable the driving system 62 to be concurrently driven by the direct current voltage source and the combustible material fuel storage source.

The combustible fuel storage 68 can be used to drive a direct current generator 86 to produce a direct current voltage that is applied via conductor 92 to the direct current voltage storage device 54. The direct current generator 86 may be a fuel cell, a motor powered by the combustible fuel to drive a direct current generator, a motor powered by the combustible fuel to drive an alternating current generator which is applied to a converter to produce a direct current voltage or other direct current generating devices as are known in the art.

In the block diagram of FIG. 3, the a hybrid electric vehicle, using the teachings of the present invention, is capable of charging a direct current voltage storage device 112 either directly from a direct current voltage source 120 or from an alternating current source 108 and an AC/DC converter 110.

The AC/DC converter 100 applies the direct current to the direct current voltage storage device 112 via a circuit depicted by lead 114.

A composition combustible fuel storage device 144 can be filled from a source such as the source labeled "composition combustible fuel". Examples of a composition combustible fuel would include gasoline or methanol, which can be converted into a combustible fuel such as for example, hydrogen. The composition combustible fuel from the storage device 144, in its first state, would be applied to a combustible fuel converter 146 via a transfer system depicted by lead 148.

The combustible fuel produced by the converter 146 is applied by conduit 150 to the combustible fuel storage device 138 where the combustible fuel is stored in its second state.

In the alternative, the combustible fuel to be stored in a separate combustible fuel storage 138 can be supplied from an external source depicted by arrow 140. This may be supplied by a filling station.

The direct current voltage stored in the direct current voltage storage device 112 is applied to a direct current motor 116 to drive the vehicle drive motor 128 via a drive member depicted by lead 130. The vehicle drive motor 128 may be powered by a combustible fuel engine 134 which applies the power to the vehicle drive motor by a driving member depicted by lead 136.

Figure 4:
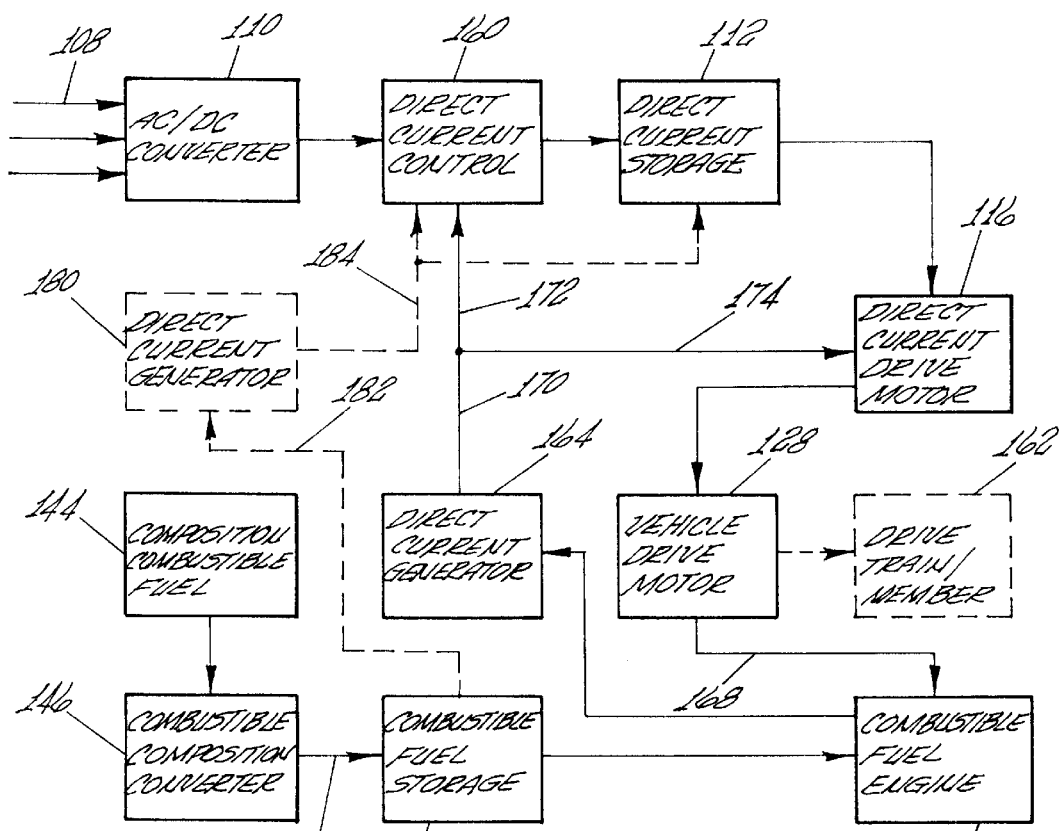
FIG. 4 is a block diagram illustrating another embodiment of a hybrid electric vehicle using the teachings of the present invention wherein a direct current generator is used for charging a battery.
Figure 5:
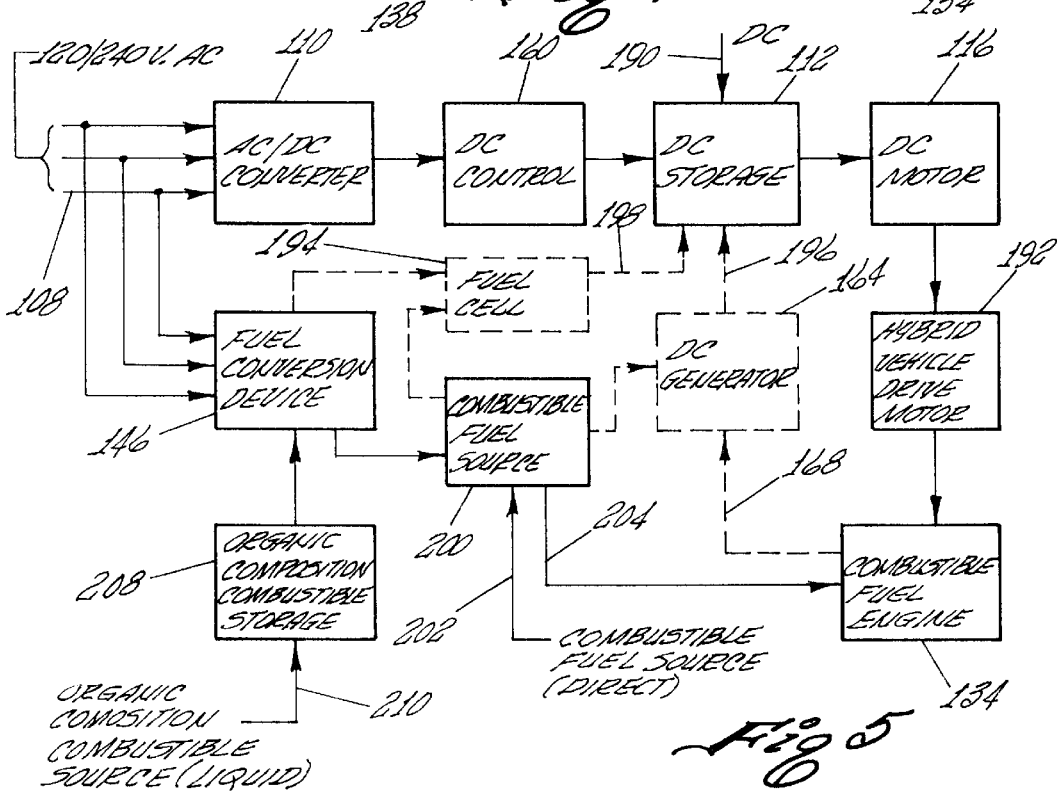
FIG. 5 is a block diagram illustrating yet another embodiment of a hybrid electric vehicle using the teachings of the present invention wherein a fuel conversion device is used for charging a combustible fuel storage device for powering a direct current generator or for charging a battery.

In FIGS. 4 and 5, the common elements are identified with the same numerals. In the embodiment of FIG. 4, a direct current generator driven from the combustible fuel engine is used to produce a direct current for charging a battery. In the embodiment of FIG. 5, a fuel conversion device, which may be a fuel cell, can be used to produce a direct current voltage for directly charging a direct current voltage storage device such as a battery.

FIGS. 4 and 5 illustrate a dual fuel source for a motor vehicle. The motor vehicle comprises an alternating current to direct current converting system located on a motor vehicle which includes an AC/DC converter 110 and a direct current control 160 to produce a direct current voltage having predetermined electrical characteristics. The source of an alternating current is depicted by input 108.

A direct current voltage storage device 112, located on the motor vehicle, is used for storing the direct current voltage. The direct current voltage is selectively applied to a direct current drive motor 116 as described herein.

In FIG. 4, a fuel composition system located on the motor vehicle includes a composition combustible fuel storage device 144, a composition combustible fuel converter 146 and a combustible fuel storage device 138 wherein the combustible fuel produced by converter 146 is applied via conduit 150 to the combustible fuel storage 138. The combustible fuel storage 138 applies the combustible fuel to a combustible fuel engine 134 which powers the vehicle drive motor 128 which, in turn, drives or powers a drive member depicted as 162 to transport the motor vehicle. A control device similar to control device 60 in FIG. 3 provides the control signals as described hereinbefore to control the operation of the direct current motor 116 and the combustible fuel engine 134.

In FIG. 4, as the direct current voltage stored in the direct current voltage storage device 112 is depleted, it can be replenished during operation by a direct current voltage produced from a direct current generator 164 which is powered by the combustible fuel engine 134 via a drive member depicted by lead 168. The direct current voltage is applied via lead 170 to either or both of the direct current control 160 via a conductor depicted by lead 172 to recharge the storage device 112 or be applied via a conductor depicted by lead 174 directly to the direct current motor 116.

In the alternative, a direct current generator, depicted by dashed box 180, which could be for example, a fuel cell, would receive the combustible fuel from the combustible fuel storage device 138 via a conduit 182 and produce a direct current voltage which could be applied to the direct current control 160 via a conductor depicted by lead 184 to recharge the direct current voltage storage device 112 or directly to the direct current storage device 112.

A control device 60 programs and controls the use of the direct current generated by generators 164 and 180 to maintain maximum efficiency. When the hybrid electric vehicle is operatively connected to an alternating current source, the control device 60 enables the production of a direct voltage from at least one of an alternating current source and the combustible material.

In FIG. 5, the fuel conversion device 146 has an organic composition combustible fuel supplied thereto from a composition combustible fuel storage 208 which is filled from a composition combustible fuel source depicted by arrow 210.

An alternating current source, such as for example a 120/240 voltage 60 hertz, three phase system, could be used to provide the electrical power to both charge a battery, depicted by the DC storage 112, and to power the fuel conversion device 146. The AC source 108 would be applied to an AC/DC converter 110 as described above. The AC source 206 would be applied to the fuel converter 146 to produce the combustible fuel to fill or charge the combustible fuel storage device 200 from an organic composition combustible fuel which is stored in the organic composition combustible fuel storage 208. The combustible fuel from storage device 200 is applied to the combustible fuel engine 134 via the fuel system depicted by lead 204. Also, a combustible fuel from a source 202 can be applied to the storage device 200. The combustible fuel can be from a service facility.

The combustible fuel from storage 200 can be applied to a combustible fuel-to-DC generator 164 to generate a direct current voltage which is directly applied to the DC Storage 112 via a conductor depicted by lead 196. In the alternative, a direct current voltage from an external source depicted by arrow 190 could be applied directly to and charge the DC storage 112. This may be supplied from a service station facility.

Also, in the alternative, the composition fuel engine 134 can power a direct current generator 164 via a drive member 168 to produce the direct current voltage.

A fuel cell shown by dashed box 194 could be supplied with a combustible fuel from the fuel conversion device 146 or from the combustible fuel storage 200. The fuel cell 194 produces a direct current voltage which could be applied to the DC storage 112 via a conductor depicted by lead 198. The fuel cell 194 would be powered by the combustible fuel source 200 in lieu of powering the fuel conversion device 146 from an alternating current source 206.

The hybrid electric vehicle depicted by FIG. 5 would use the control device 60 to enable the production of a direct current voltage from at least one of an alternating current source and the combustible material or combustible fuel and the applying of the produced direct current voltage to the direct current voltage storage device 112. Also, the control device could apply the produced direct current voltage to at least one of the direct current motor 116 and the direct current voltage storage device 112.

This invention has utility for use in a hybrid electric vehicle having: (i) a driving system driven by a direct current motor powered by a battery; (ii) an internal combustion engine powered by a combustible fuel; and (iii) a battery charging device adapted to be connected to a source of alternating current for charging the battery. In practicing this invention, the hybrid electric vehicle would include a fuel converter for receiving a composition combustible fuel in a first state and for converting the composition combustible fuel into a combustible material or combustible fuel in a second state and for storing the combustible material or combustible fuel in the second state in a combustible material or combustible fuel storage device for use as an alternative energy source.

In such a hybrid electric vehicle, a control device is operatively connected to and controls the direct current motor for driving the driving system in response to a first control signal and to the internal combustible engine for driving the driving system in response to a second control signal. The control device is adapted to selectively apply at least one of the first control signal to the direct current motor 116 and the second control signal to the internal combustible engine 134 to enable the driving system including vehicle drive motor 128 to be driven by at least one of the direct current voltage and the combustible material or combustible fuel.

In the alternative, the control device may concurrently apply the first control signal to the direct current motor and the second control signal to the internal combustible engine to enable the driving system to be driven by at both the direct current voltage and the combustible fuel, when necessary for additional power.

In the embodiment of the hybrid electric vehicle of FIG. 5, the control device controls the alternating current source to enable the battery charger to charge the battery to a desired charging level and to concurrently power the fuel converter to fill the combustible fuel storage device to a desired volume level or weight.

This invention also discloses and teaches a method of driving a motor vehicle with alternate fuel sources comprising the steps of: (a) producing with an alternating current to direct current converter a direct current voltage; (b) storing the direct current voltage in a direct current voltage storage device; (c) receiving with a fuel converter a fuel in a first state and converting the fuel into a combustible material in a second state; (d) storing the combustible matter in the second state in a combustible matter storage device; (e) transporting with a driving system the motor vehicle wherein the driving system includes a direct current motor operatively coupled to the direct current voltage storage device and the direct current motor is responsive to stored direct current voltage for driving the driving system in response to a first control signal and a combustible material motor operatively coupled to the driving system is responsive to stored combustible material in the second state for driving the driving system in response to a second control signal; and (f) selectively applying with a control device operatively connected to the direct current motor and to the combustible material motor at least one of the first control signal to the direct current motor and the second control signal to the combustible material motor to enable the driving system to be driven by at least one of the direct current voltage and the combustible material.

The method during the step of selectively applying may include the control device selectively applying both the first control signal to the direct current motor and the second control signal to the combustible material engine to enable the driving system to be concurrently driven by the direct current voltage and the combustible material.

It is envisioned that the teachings of the present invention may be used with conventional hybrid electric vehicle using gasoline as the composition combustible fuel for powering an internal combustion engine and re-chargeable batteries for powering a direct current drive motor. This invention would have application in vehicles having a fuel cell, as a secondary battery source, to re-charge a main power battery.

It is further envisioned that as fuel converters are developed which are able to produce a direct current voltage from organic fuels, such as methanol, that such fuel converters would provide direct current for both re-charging a power battery or for directly driving a direct current motor to provide the maximum power for concurrently driving the motor vehicle from two or more energy sources.

All such variations and incorporating of the teachings of the present invention are envisioned to be covered by and anticipated by the teachings set forth herein.

What is claimed is:

1. A hybrid electric vehicle comprising
   an alternating current to direct current converter for producing and storing a direct current voltage in a direct current voltage storage device prior to starting of a hybrid electric vehicle;
   a fuel converter for receiving a composition fuel in a first state and converting said composition fuel into a combustible material in a second state and storing said combustible material in a combustible material storage device at at least one of prior to the starting of and the operation of the hybrid electric vehicle;
   a driving system for transporting a hybrid electric vehicle, said driving system including
      a direct current motor operatively coupled to said driving system and to said direct current voltage storage device, said direct current motor being responsive to a stored direct current voltage for driving said driving system in response to a first control signal;
      a combustible material engine operatively coupled to said driving system and to said combustible material storage device, said combustible material engine being responsive to stored combustible material for driving said driving system in response to a second control signal; and
      a control device operatively connected to said direct current motor and to said combustible material engine to selectively apply at least one of said first control signal to said direct current motor and said second control signal to said combustible material engine to enable said driving system to be driven by at least one of said direct current voltage and said combustible material.

2. The hybrid electric vehicle of claim 1 wherein said control device selectively applies both said first control signal to said direct current motor and said second control signal to said combustible material engine to enable said driving system to be concurrently driven by said direct current voltage and said combustible material.

3. The hybrid electric vehicle of claim 1 wherein said alternating current to direct current converter includes
   a direct current control device for controlling the direct current characteristics of the direct current voltage and for applying said direct current voltage having said predetermined characteristics to said direct current voltage storage device.

4. The hybrid electric vehicle of claim 1 further comprising a fuel converter for converting in response to an electrical current an organic fuel in said first state into a combustible material in said second state.

5. The hybrid electric vehicle of claim 4 further comprising an organic fuel storage device located within said hybrid electric vehicle for storing said organic fuel in a first state and for applying said organic fuel in said first state to said fuel converter for converting said organic fuel into said combustible material in said second state.

6. The hybrid electric vehicle of claim 1 further comprising
   a fuel converter responsive to an alternating current voltage for converting fuel in said first state into a combustible material in said second state.

7. The hybrid electric vehicle of claim 6 further comprising
   a fuel storage device located within said hybrid electric vehicle for storing a fuel in a first state and applying a fuel in said first state to said fuel converter.

8. The hybrid electric vehicle of claim 6 wherein said control device enables said fuel converter to respond to an alternating current voltage for converting said fuel in said first state into a combustible material in said second state and storing said combustible fuel in said combustible fuel storage device.

9. The hybrid electric vehicle of claim 1 further comprising
   a combustible material to direct current generator being operatively connected to said combustible material storage device for producing a direct current voltage.

10. The hybrid electric vehicle of claim 9 wherein said control device applies said direct current voltage generated by said combustible material to direct current generator to at least one of said direct current voltage storage device and said direct current motor.

11. The hybrid electric vehicle of claim 10 wherein said control device enables the production of a direct current voltage from at least one of an alternating current source and said combustible material to direct current generator.

12. The hybrid electric vehicle of claim 10 wherein said control device enables the production of a direct current voltage from at least one of an alternating current source and said combustible material to direct current generator and applies the produced direct current voltage to said direct current voltage storage device.

13. The hybrid electric vehicle of claim 10 wherein said control device enables the production of a direct current voltage from at least one of an alternating current source and said combustible material to direct current generator and applies the produced direct current voltage to at least one of said direct current motor and said direct current voltage storage device.

14. The hybrid electric vehicle of claim 13 wherein said control device applies the produced direct current voltage concurrently to said direct current motor and said direct current voltage storage device.

15. A dual fuel source for a motor vehicle comprising
   an alternating current to direct current converting system located on a motor vehicle, said converting system being adapted to receive an alternating current voltage and being responsive thereto for producing a direct current voltage prior to starting of a motor vehicle;
   a direct current voltage storage device located on said motor vehicle for storing said direct current voltage;
   a fuel composition system located on said motor vehicle for converting a composition fuel in a first state into a combustible fuel in a second state at at least one of prior to the starting of and the operation of the motor vehicle;

a composition fuel storage device located on said motor vehicle for storing said composition fuel;

a combustible fuel storage device located within said motor vehicle for storing said combustible fuel;

a driving member located within and for driving said motor vehicle, said driving member including a direct current drive motor responsive to stored direct current voltage for driving said driving member in response to a first control signal;

a combustible fuel engine responsive to the combustible fuel stored in said combustible fuel storage device for driving said driving member in response to a second control signal; and a control device operatively connected to said direct current drive motor and to said combustible fuel engine to selectively apply at least one of said first control signal to said direct drive motor and said second control signal to said combustible fuel motor to enable said driving member to be driven by at least one of said direct current voltage and said combustible fuel.

16. The hybrid electric vehicle of claim 15 wherein said control device selectively applies both said first control signal to said direct current motor and said second control signal to said combustible fuel motor engine to enable said driving system to be concurrently driven by said direct current voltage and said combustible fuel.

17. The hybrid electric vehicle of claim 15 wherein said alternating current to direct current converter includes a direct current control device for controlling the direct current characteristics of the direct current voltage and for applying said direct current voltage having said predetermined characteristics to said direct current voltage storage device.

18. The hybrid electric vehicle of claim 15 wherein said composition fuel is gasoline and said fuel converter converts gasoline in said first state into hydrogen in said second state.

19. The hybrid electric vehicle of claim 15 wherein said composition fuel is an organic fuel and said fuel converter converts said an organic fuel in said first state into hydrogen in said second state.

20. The hybrid electric vehicle of claim 15 wherein said composition fuel is a water and said fuel converter converts said water in said first state into hydrogen in said second state.

21. A motor vehicle having a dual fuel source an comprising input located on a motor vehicle adapted to be operatively connected to an alternating current voltage source;

an alternating current to direct current converter located on said motor vehicle and being operatively coupled to said input for receiving said alternating current voltage and producing a direct current prior to starting of a motor vehicle;

a direct current control circuit operatively connected to said converter for producing a direct current voltage having a predetermined electrical characteristic;

a direct current voltage storage device located on said motor vehicle and operatively connected to said direct current control circuit for storing said direct current voltage;

a composition fuel storage device within said motor vehicle for storing a composition fuel in a first state;

a composition fuel conversion device operatively connected to said composition fuel storage source for receiving said composition fuel in said first state and converting said composition fuel into a combustible fuel in a second state at at least one of prior to the starting of and the operation of the motor vehicle;

a combustible fuel storage device located within said motor vehicle for storing said combustible fuel;

a driving member located within and for driving said motor vehicle, said driving member including a direct current drive motor responsive to stored direct current voltage for driving said driving member in response to a first control signal;

a combustible fuel engine responsive to the combustible fuel stored in said combustible fuel storage device for driving said direct current driving motor in response to a second control signal; and a control device operatively connected to said direct current drive motor and to said combustible fuel engine to selectively apply at least one of said first control signal and said second control signal to said direct current drive motor and to said combustible fuel engine to enable said driving member to be driven by at least one of said direct current voltage and said combustible fuel.

22. The motor vehicle of claim 21 wherein said control device selectively applies both said first control signal to said direct current motor and said second control signal to said combustible fuel engine to enable said driving system to be concurrently driven by said direct current voltage and said combustible fuel.

23. The hybrid electric vehicle of claim 21 wherein said alternating current to direct current converter includes a direct current control device for controlling the direct current characteristics of the direct current voltage and for applying said direct current voltage having said predetermined characteristics to said direct current voltage storage device.

24. A hybrid electric vehicle having a driving system driven by a direct current motor powered by a battery and a internal combustion engine powered by a combustible fuel and a battery charging device adapted to be connected to a source of alternating current for charging the battery prior to starting of a hybrid electric vehicle, said hybrid electric vehicle comprising a fuel converter for receiving a composition fuel in a first state and converting said composition fuel into a combustible material in a second state at at least one of prior to the starting of and the operation of the hybrid electric vehicle, and storing said combustible material in a combustible material storage device; and a control device operatively connected to and controlling said direct current motor for driving said driving system in response to a first control signal and said internal combustion engine for driving said driving system in response to a second control signal, said control device being adapted to selectively apply at least one of said first control signal to said direct current motor and said second control signal to said internal combustion engine to enable said driving system to be driven by at least one of said direct current voltage and said combustible material.

25. The hybrid electric vehicle of claim 24 wherein said combustible fuel converter is responsive to the source of alternating current for converting said combustible fuel into a combustible material in a second state and for storing said combustible material in a combustible material storage device.

26. The hybrid electric vehicle of claim 25 wherein said control device controls the alternating current source to enable the battery charger to charge the battery to a desired charging level and the fuel converter to fill the combustible material fuel storage device to at least one of a desired volume level and desired weight level.

27. The hybrid electric vehicle of claim 24 wherein said control device concurrently applies said first control signal to said direct current motor and said second control signal to said combustible material engine to enable said driving system to be driven by both said direct current voltage and said combustible material.

28. A method of driving a motor vehicle with alternate fuel sources comprising the steps of producing with an alternating current to direct current converter a direct current voltage prior to starting of a motor vehicle;

storing said direct current voltage in a direct current voltage storage device;

receiving with a fuel converter a fuel in a first state and converting said fuel into a combustible material in a second state at at least one of prior to the starting of and the operation of the motor vehicle; and storing said combustible material in a combustible material fuel storage device.

29. The method of claim 28 further comprising the steps of transporting with a driving system the motor vehicle wherein said driving system includes a direct current motor operatively coupled to said direct current voltage storage device and said direct current motor is responsive to stored direct current voltage for driving said driving system in response to a first control signal and a combustible material motor operatively coupled to said driving system is responsive to stored combustible material for driving said driving system in response to a second control signal; and selectively applying with a control device operatively connected to said direct current motor and to said combustible material motor at least one of said first control signal to said direct current motor and said second control signal to said combustible material motor to enable said driving system to be driven by at least one of said direct current voltage and said combustible material.

30. The method of claim 29 the step of selectively applying includes said control device selectively applying both said first control signal to said direct current motor and said second control signal to said combustible material engine to enable said driving system to be concurrently driven by said direct current voltage and said combustible material.

31. The method of claim 29 wherein the step of producing includes using a direct current control device for controlling the direct current characteristics of the direct current voltage.

32. The method of claim 30 wherein the step of applying includes applying said direct current voltage having said predetermined characteristics to said direct current voltage storage device.

33. The method of claim 30 further comprising the step of generating a direct current voltage with a combustible fuel to direct current generator enabling a direct current voltage to be produced from at least one of an alternating current source and said combustible fuel.

* * * * *